(12) United States Patent
Hanks et al.

(10) Patent No.: US 7,177,246 B2
(45) Date of Patent: Feb. 13, 2007

(54) OPTICAL DISK DRIVE FOCUSING APPARATUS USING SUM SIGNAL

(75) Inventors: Darwin Mitchel Hanks, Fort Collins, CO (US); Mike Salko, Corvallis, OR (US); Andrew Van Brocklin, Corvallis, OR (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 537 days.

(21) Appl. No.: 10/661,394

(22) Filed: Sep. 12, 2003

(65) Prior Publication Data

US 2005/0058030 A1    Mar. 17, 2005

(51) Int. Cl.
*G11B 7/00* (2006.01)
*G02B 7/04* (2006.01)

(52) U.S. Cl. .............. 369/44.41; 369/44.29; 250/201.5

(58) Field of Classification Search ............. None
See application file for complete search history.

(56) References Cited

U.S. PATENT DOCUMENTS

| | | | |
|---|---|---|---|
| 4,027,217 A | | 5/1977 | Harman |
| 4,628,379 A | * | 12/1986 | Andrews et al. ......... 360/77.05 |
| 4,967,286 A | | 10/1990 | Nomula et al. |
| 5,142,520 A | * | 8/1992 | Yanagi et al. ............ 369/44.29 |
| 5,182,741 A | | 1/1993 | Maeda et al. |
| 5,398,231 A | | 3/1995 | Shin et al. |
| 5,498,509 A | | 3/1996 | Shin et al. |
| 5,608,717 A | | 3/1997 | Ito et al. |
| 5,608,718 A | | 3/1997 | Schiewe |
| 5,627,895 A | | 5/1997 | Owaki |
| 5,675,570 A | | 10/1997 | Ohira et al. |
| 5,688,173 A | | 11/1997 | Kitahara et al. |
| 5,729,533 A | | 3/1998 | Marquardt |
| 5,742,573 A | * | 4/1998 | Hajjar et al. ............. 369/44.32 |
| 5,745,457 A | | 4/1998 | Hayashi et al. |
| 5,748,607 A | | 5/1998 | Ohira et al. |
| 5,751,671 A | | 5/1998 | Koike et al. |
| 5,764,430 A | | 6/1998 | Ottesen et al. |
| 5,766,495 A | | 6/1998 | Parette |
| 5,781,221 A | | 7/1998 | Wen et al. |
| 5,846,131 A | | 12/1998 | Kitahara |
| 5,875,156 A | | 2/1999 | Ito et al. |
| 5,915,858 A | | 6/1999 | Wen |
| 5,949,752 A | | 9/1999 | Glynn et al. |
| 5,958,651 A | | 9/1999 | van Hoof et al. |
| 5,967,676 A | | 10/1999 | Cutler et al. |

(Continued)

FOREIGN PATENT DOCUMENTS

EP        0805439        11/1997

(Continued)

*Primary Examiner*—William Korzuch
*Assistant Examiner*—Christopher Lamb (57) ABSTRACT

A system provides a signal to an actuator within an optical pickup unit of an optical disk drive. In one implementation, SUM signal data (an output from the quad sensors typically present in the optical pickup unit) is recorded within a SUM table. An error term generator processes the SUM signal data from the SUM table to produce an error term. An actuator control signal generator generates a signal to control movement of the actuator, wherein the signal is a function of a prior actuator position, the error term and an adaptation coefficient, wherein the adaptation coefficient impacts a rate at which the error term is allowed to modify the prior actuator position.

49 Claims, 6 Drawing Sheets

U.S. PATENT DOCUMENTS

| | | |
|---|---|---|
| 5,997,976 A | 12/1999 | Mueller et al. |
| 6,019,151 A | 2/2000 | Wen et al. |
| 6,026,066 A | 2/2000 | Maezawa |
| 6,034,930 A | 3/2000 | Kitahara |
| 6,074,031 A | 6/2000 | Kahle |
| 6,102,800 A | 8/2000 | Kitahara et al. |
| 6,104,677 A | 8/2000 | Kirihara et al. |
| 6,124,011 A | 9/2000 | Kern |
| 6,160,789 A | 12/2000 | Abraham |
| 6,202,550 B1 | 3/2001 | Lee et al. |
| 6,264,295 B1 | 7/2001 | Bradshaw et al. |
| 6,270,176 B1 | 8/2001 | Kahle |
| 6,295,261 B1 | 9/2001 | Kim |
| 6,317,399 B1 | 11/2001 | Ohtani et al. |
| 6,384,929 B1 | 5/2002 | Miller |
| 6,386,667 B1 | 5/2002 | Cariffe |
| 6,403,191 B1 | 6/2002 | Casagrande |
| 6,440,248 B1 | 8/2002 | Mueller |
| 6,452,883 B2 | 9/2002 | Chan |
| 6,469,969 B2 | 10/2002 | Carson et al. |
| 6,584,048 B1 | 6/2003 | Tateishi et al. |
| 6,714,492 B2 * | 3/2004 | Kim ........................ 369/44.32 |
| 6,813,226 B2 * | 11/2004 | Kadlec et al. ........... 369/44.27 |
| 2002/0089906 A1 * | 7/2002 | Faucett ................... 369/44.32 |
| 2002/0191517 A1 | 12/2002 | Honda et al. |
| 2003/0123344 A1 | 7/2003 | Fujiune et al. |

FOREIGN PATENT DOCUMENTS

| | | |
|---|---|---|
| EP | 1017044 | 7/2000 |
| EP | 1341163 | 9/2003 |
| WO | PCT/US2004/027950 | 4/2005 |

* cited by examiner

510
GENERATE AN ACTUATOR CONTROL SIGNAL
USING THE ERROR SIGNAL

602
IMPLEMENTATION 1: GENERATE COEFFICIENTS AND SUM A FOURIER SERIES

604
IMPLEMENTATION 2: MODIFY COEFFICIENTS TO ADJUST FOR HIGHER FREQUENCY DISK-SPIN RATE

606
IMPLEMENTATION 3: GENERATE THE ACTUATOR CONTROL SIGNAL BY MODIFYING THE EXISTING SIGNAL WITH MU AND AN ERROR TERM

OPTICAL DISK DRIVE FOCUSING APPARATUS USING SUM SIGNAL

RELATED APPLICATIONS

This patent application is related to U.S. patent application Ser. No. 10/661,752, titled "Optical Disk Drive Focusing Apparatus", filed on even day herewith, commonly assigned herewith, and hereby incorporated by reference.

BACKGROUND

When reading or writing data to the data side of a CD, conventional use of a FES (focus error signal) provides information that allows operation of a closed-loop feedback circuit to keep the optical pickup unit (OPU) focused on the data pits defined on an upper surface of a plastic layer.

However, emerging technology makes it possible to write to the label side of the CD, thereby producing an image, text and/or graphics. Unfortunately, conventional use of a FES to focus on the label side of the disk is ineffective.

An initial difficulty in focusing on the label side of the disk is that the FES signal provides a low signal-to-noise ratio, in part due to the nature of the media used to cover the label side of the disk. Because of the low signal-to-noise ratio, conventional use of a FES signal configured in a closed-loop feedback circuit will not effectively provide signals to the actuator focus coil which result in convergence on the focal point.

A second difficulty in using the FES signal in a conventional manner is that the OPU is biased at rest to focus at a distance further than the surface of the label side of the disk. This is because the OPU is designed to focus on data pits defined approximately 1.2 mm from the surface of the data side of the disk. Thus, a DC offset must be found to result in movement of the actuator away from the disk surface when focusing on the label side of the disk.

Additionally, tilting of the disk within the optical disk drive and variances in the thickness of the disk produce focus errors that tend to appear as a sinusoidal variation once per revolution of the disk. Similarly, warping of the disk creates focus errors that may appear as a sinusoidal variation twice per revolution. Without an effective closed-loop feedback circuit, these sources of focus error can result in much degraded performance when marking an image to the label side of a disk.

As a result, new and improved systems and methods of focusing the OPU on the label side are needed.

SUMMARY

A system provides a signal to an actuator within an optical pickup unit of an optical disk drive. In one implementation, SUM signal data (an output from the quad sensors typically present in the optical pickup unit) is recorded within a SUM table. An error term generator processes the SUM signal data from the SUM table to produce an error term. An actuator control signal generator generates a signal to control movement of the actuator, wherein the signal is a function of a prior actuator position, the error term and an adaptation coefficient, wherein the adaptation coefficient impacts a rate at which the error term is allowed to modify the prior actuator position.

BRIEF DESCRIPTION OF THE DRAWINGS

The following detailed description refers to the accompanying figures. In the figures, the left-most digit(s) of a reference number identifies the figure (Fig.) in which the reference number first appears. Moreover, the same reference numbers are used throughout the drawings to reference like features and components.

DETAILED DESCRIPTION

Figure 1:
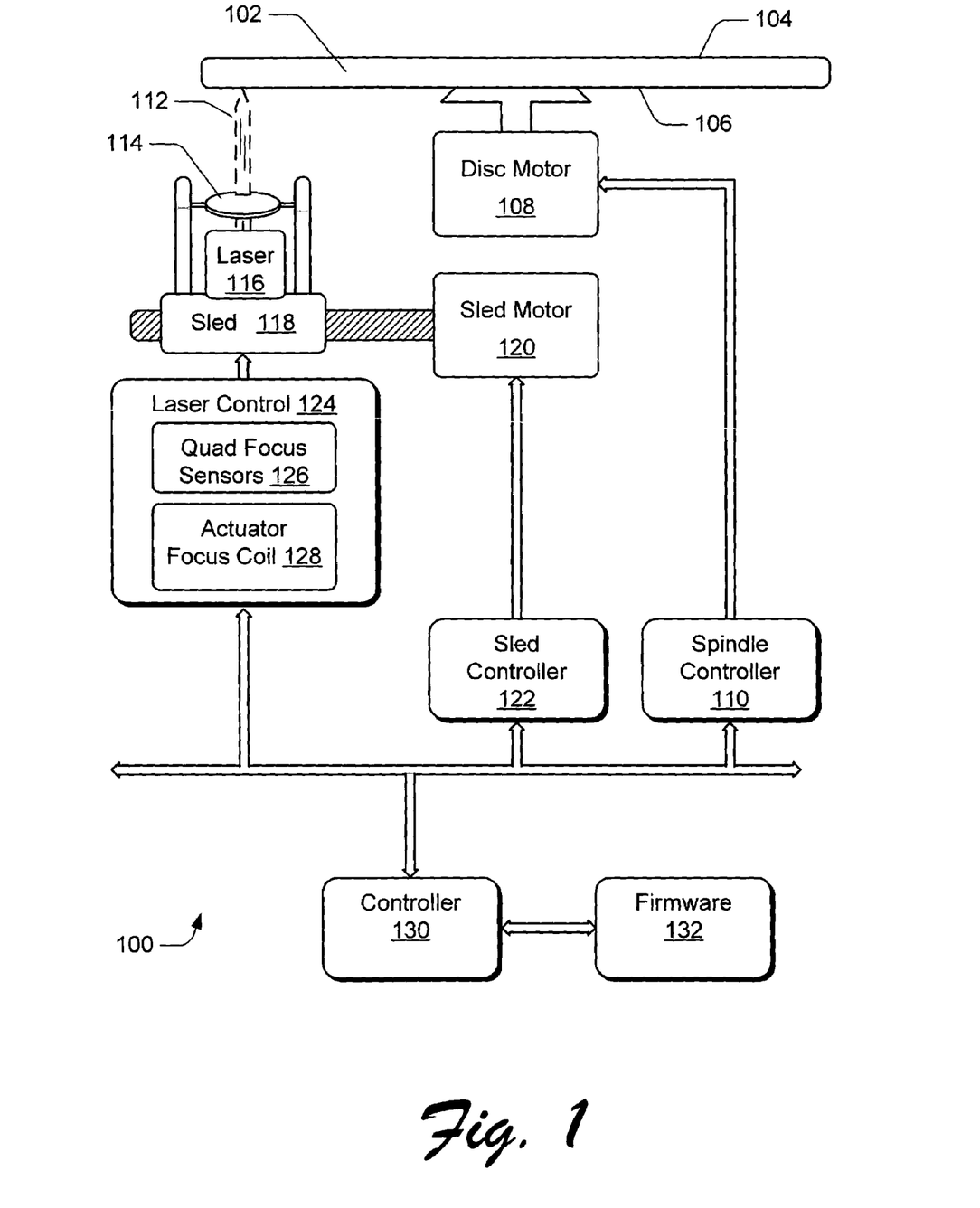
FIG. 1 is a diagrammatic view of an exemplary implementation of an optical disk drive.

FIG. 1 shows a somewhat diagrammatic view of the exemplary disk drive and controller system 100. A disk 102 having an information side 104 is oriented to position the label side 106 for marking. The disk is rotated by a disk or spindle motor 108, which is controlled by the spindle controller 110. The laser beam 112 strikes the coated surface of the label side 106 of the disk 102 after passing through optics, such as a lens 114. The laser 116 is carried by a sled 118, which is moved in a radial direction by the sled motor 120. In a typical application, the sled motor 120 advances the sled 118, carrying the laser 116, in incremental steps from a radially inner edge of the label region, to a radially outer edge of the label region under the direction of a sled controller 122.

Figure 7:
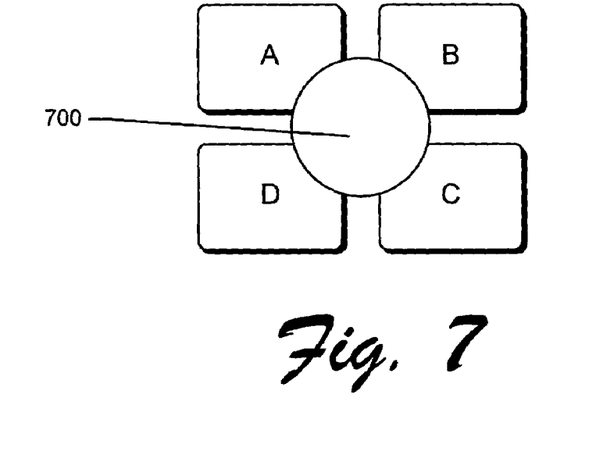
FIG. 7 is a diagrammatic view of a quad sensor, illustrating an in-focus condition.
Figure 8:
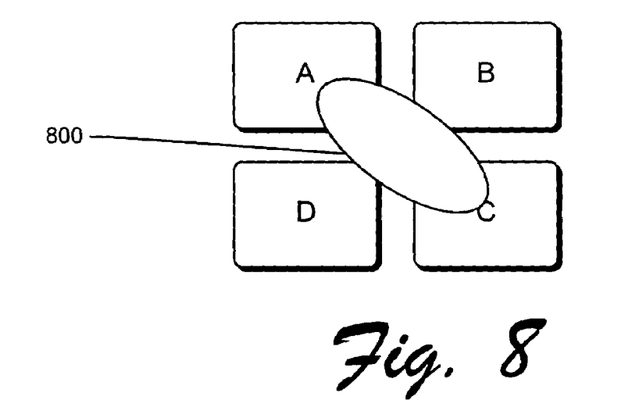
FIGS. 8 and 9 are diagrams similar to that of FIG. 7, in which the quad sensor detects out-of-focus conditions wherein the optics focus too close and too far, relative to the focal point.
Figure 9:
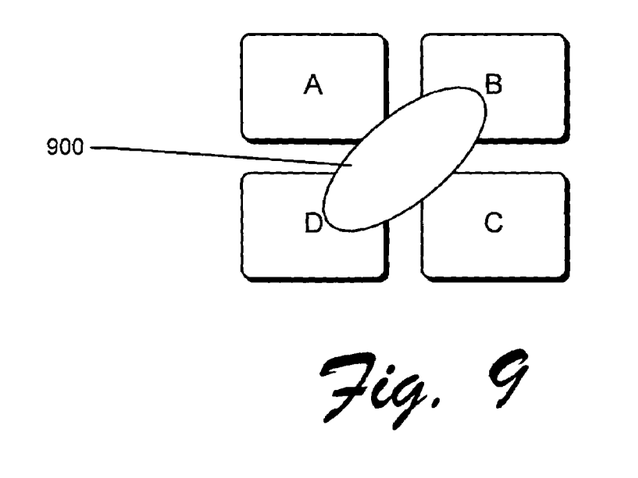

A laser controller 124 controls the operation of the laser 116 and associated tracking coils and sensors. In the example of FIG. 1, a quad focus sensor 126 typically contains four sensors, and is designed to facilitate focusing generally, in part by sensing the distance between the laser and the disk. The operation of the quad focus sensors may be understood with reference to FIGS. 7–9. In FIG. 7, the four quad sensors, labeled A–D are seen. The output of the quad sensors may be used to form both the FES (focus error signal) and the SUM signal. The FES signal is defined: $FES=(V_A+V_C)-(V_B+V_D)$, wherein $V_A$ is the voltage of sensor A, etc. The SUM signal is defined: $SUM=V_A+V_B+V_C+V_D$. Reflected light 700 is seen in a generally circular configuration, which implies that each sensor is similarly affected. Accordingly, the FES signal is approximately zero (0) volts. FIGS. 8 and 9 illustrate conditions wherein the reflected light 800, 900 indicates that the optics is in front of, and behind, the focal point. The outputs of the four sensors are combined to form the SUM signal, which is discussed below. An actuator focus coil 128 is configured to adjust the optics 114 to focus the laser 116 at points closer to, and further from, the disk 102.

A controller 130 controls the operation of the exemplary disk drive and controller system 100. In particular, the controller 130 is configured to execute program statements such as those contained in firmware 132.

Figure 2:
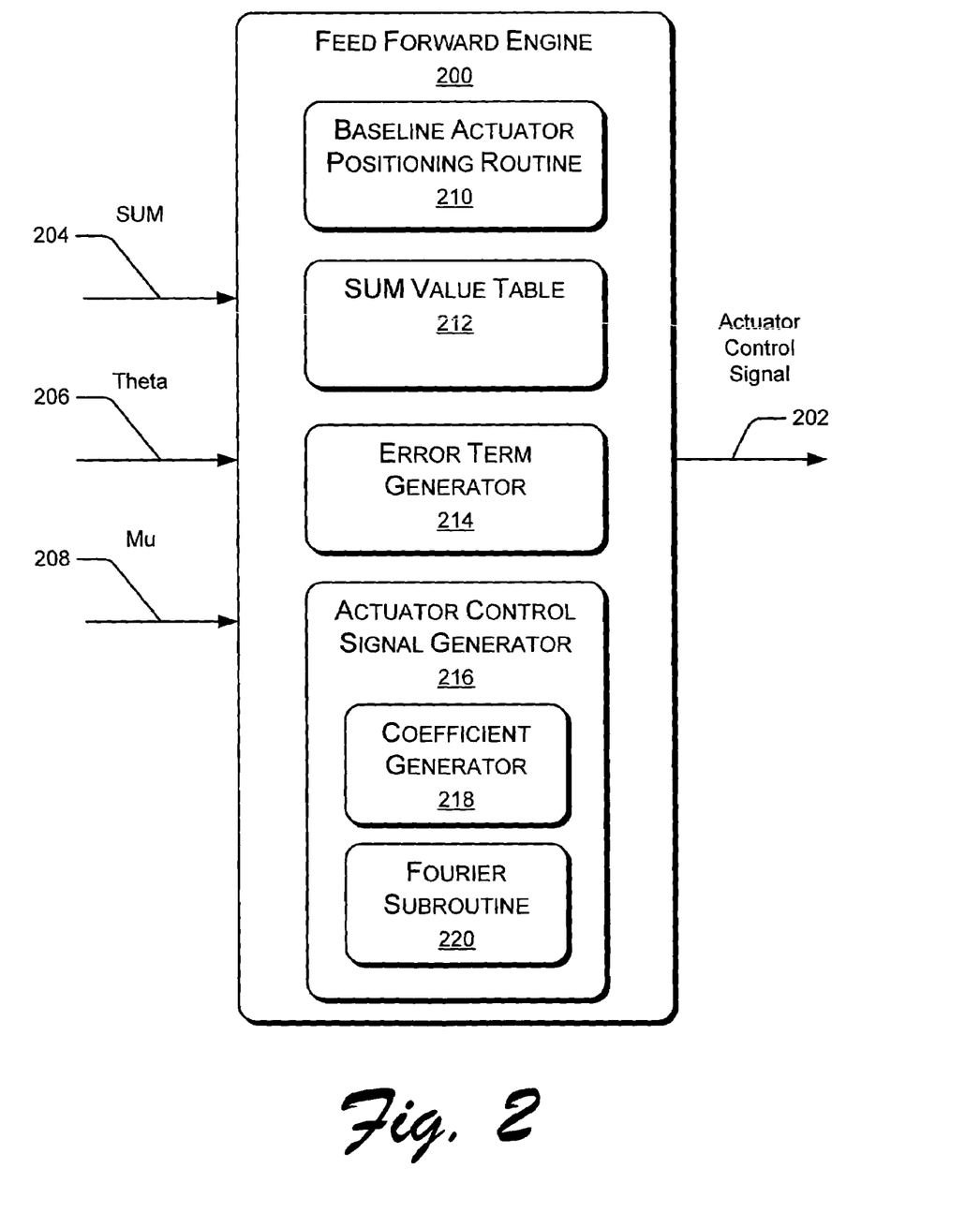
FIG. 2 is a block diagram showing an exemplary implementation of a feed forward engine contained within firmware of the diagrammatic view of the optical disk drive of FIG. 1.

FIG. 2 shows an exemplary feed forward engine 200, which may be defined by program statements contained within firmware 132 for execution by the processor or controller 130. The feed forward engine 200 receives one or more inputs and provides as output an actuator control signal 202, which can be fed into the actuator focus coil 128 (FIG. 1) to control the focus of the laser 116, optics 114 and associated assembly. The exemplary feed forward engine 200 receives inputs including a SUM signal 204 from the quad focus sensors 126 (FIG. 1) and an angle theta 206 which describes the angular orientation of the disk 102 (FIG. 1) within the optical drive 100 (FIG. 1). In some implementations, a coefficient Mu 208 is also provided to the feed forward engine. As will be seen in greater detail below, the coefficient Mu balances a rate at which the SUM signal 204 is used to modify a current voltage applied to the actuator focus coil 128. The value of the Mu input 208 may be more fully understood by realizing that if the SUM signal is allowed to overly influence a present value of the voltage input to the actuator coil 128, the actuator coil 128 may swing too wildly and fail to converge, i.e. focus the laser on the label surface 106 of the disk. In a worst case situation, if Mu were not used to damp changes brought on by wild swings in the value of the SUM signal, the focus level may leave the region within which the SUM signal may be detected; this could cause a complete failure to focus. However, if the SUM signal is overly suppressed from influencing the present value of the voltage input to the actuator coil 128, the laser may not respond quickly enough to changing conditions, and may fail to focus. Accordingly, the value of Mu input 208 should be selected according to the specific application to result in proper focus.

A baseline actuator positioning routine 210 is configured to determine a baseline voltage level for application to the actuator focus coil 128, to result in an associated baseline actuator position and focus optics position. The actuator 128 has an inherent, initial or at-rest position, which may reflect an inherent or default voltage applied to the coil, or which may reflect the coil being allowed to "float" at an initial voltage level. As a result, the focal optics moved by the actuator have an inherent, default or at-rest focal point. In part because the optics 114 are designed to focus on a location within the disk, the at-rest position of the actuator 128 and optics 114 is typically too close to the disk to result in proper focus on the disk surface 106 without application of a signal to the actuator 128. As a result, it is beneficial to establish a baseline voltage, the application of which to the actuator coil 128 results in approximate focusing of the optics 114 on the surface 106 of the disk 102. Accordingly, the baseline actuator positioning routine 210 determines the baseline voltage level. It is sometimes the case that the baseline voltage has an AC component, i.e. the baseline voltage may vary as a function of the angular orientation (i.e. the spin) of the disk. Such an AC component can vary according to the sectors of FIG. 3, or as a function of the angular disk orientation. Such an AC component allows the baseline voltage to vary the actuator focus coil 128 to maintain the focus of the optics 114 on the surface 106 of the disk 102, even where the disk is warped, wedge-shaped, or otherwise imperfect.

In a first exemplary implementation, the baseline actuator positioning routine 210 is configured to apply an initial voltage to the actuator coil 128 to move the focal point of the optics 114 away from the disk 102 (FIG. 1) by an amount calculated to counteract an initial design assumption typically built into the actuator coil. The design assumption is that the focus point should be inside the plastic disk 102, to facilitate data reading and writing. However for labeling the disk, the focus point should be on the disk surface. Accordingly, a baseline voltage may be estimated to result in movement of the actuator coil 128, and an associated change in the focal point of the optics 114, which retracts the focal point by an appropriate fraction of the thickness of the optical disk 102, thereby causing the focal point to be (approximately) on the surface 106 of the disk 102.

The above first exemplary implementation of the baseline positioning routine 210 makes a first assumption that the optics 114 is focused on a point a known depth beneath the surface 106 of the disk 102, and a second assumption that a voltage can be calculated to move the focal point to the surface of the disk. A second implementation of the baseline positioning routine 210 is based on the use of objective measurements. The baseline actuator positioning routine 210 is configured to move the optics 114 through a full range of focus, i.e. from focusing too near to focusing too far away. The baseline actuator positioning routine 210 is configured to step the actuator coil 128 through this range incrementally, and to record values obtained from the SUM. Upon completion of the application of the range of voltages to the actuator coil 128, and movement of the focus optics, the maximum value of the SUM signal is recorded. This value may be assumed to have occurred when the optics was approximately in focus; additionally, the voltage which resulted in the position of the optics may be taken as the baseline voltage.

Alternatively, to cancel some inaccuracies within the operation of the actuator focus coil 128, DC voltage may again be stepped incrementally into the actuator focus coil to move the optics 114 until the SUM signal is approximately 75% (more or less) of the maximum recorded during the first application of incremental voltages to the actuator coil 128. This DC voltage level may be used as the baseline voltage level.

Note that different sectors of the disk may be assigned a different baseline voltage, if desired. For example, the second implementation of the baseline positioning routine 210 described above could be implemented separately for each sector arbitrarily defined on the optical disk 102. Accordingly, the baseline voltage may include an alternating current component.

The feed forward engine 200 may create a SUM value table 212. An exemplary SUM value table contains values of the SUM signal for each sector of the disk 102, and for movement of the actuator in both directions (i.e. toward the disk and away from the disk) from the baseline position. Detail of an exemplary SUM table 212 is seen in Table 1, below. Table 1 shows many specifics that are for purposes of illustration only; for example, the number of sectors defined and samples taken could easily be changed while maintaining consistency with the concepts illustrated. Similarly, columns 4 and 5 are for purposes of illustrating concepts, and are typically not implemented. Similarly, columns 2 and 3 could be replaced with a single column containing the difference of the two columns (e.g. column 2 values minus column 3 values).

TABLE 1

| Sector | Toward | Away | Sample | Return |
|--------|--------|------|--------|--------|
| 1 | X1 | Y1 | 0–24 | 25–49 |
| 2 | X2 | Y2 | 50–74 | 75–99 |
| 3 | X3 | Y3 | 100–124 | 125–149 |
| 4 | X4 | Y4 | 150–174 | 175–199 |
| 5 | X5 | Y5 | 200–224 | 225–249 |
| 6 | X6 | Y6 | 250–274 | 275–299 |
| 7 | X7 | Y7 | 300–324 | 325–349 |
| 8 | X8 | Y8 | 350–374 | 375–399 |

Figure 3:
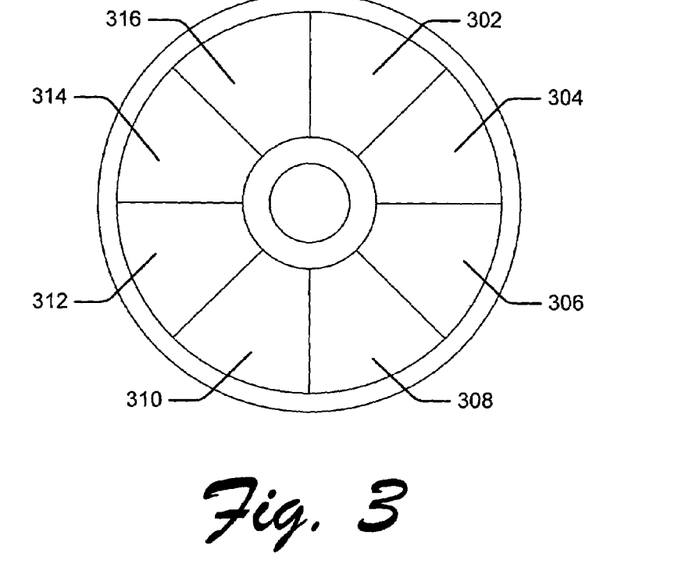
FIG. 3 is a view of an optical disk, illustrating exemplary division of the disk into a plurality of sectors.

Briefly, Table 1 illustrates data associated with a disk having eight sectors (note the eight rows in the table). Referring briefly to FIG. 3, it can be seen that, for purposes of illustration only, eight sectors 302–316 are present in the disk 102. Columns 2 and 3 list numbers representing the sum of the SUM signal as a given sector passed by the quad focus sensor 126 (FIG. 1). (Recall that the SUM signal is so named due to the fact that the output of the quad optical sensors are combined to form the SUM signal.) The totaled values of the SUM signal in column 2 resulted when the actuator moved the focal point toward the disk from the baseline location; the totaled values of the SUM signal in column 3 resulted when the actuator moved the focal point away from the disk. Columns 4 and 5 indicate that where the disk is sampled 400 times per revolution (i.e. the SUM signal is read 400 times per revolution), samples are actually made only as indicated in column 4. As the sample locations seen in column 5 pass the quad sensors, no sample is taken. Instead, the actuator returns to the baseline position.

Figure 4:
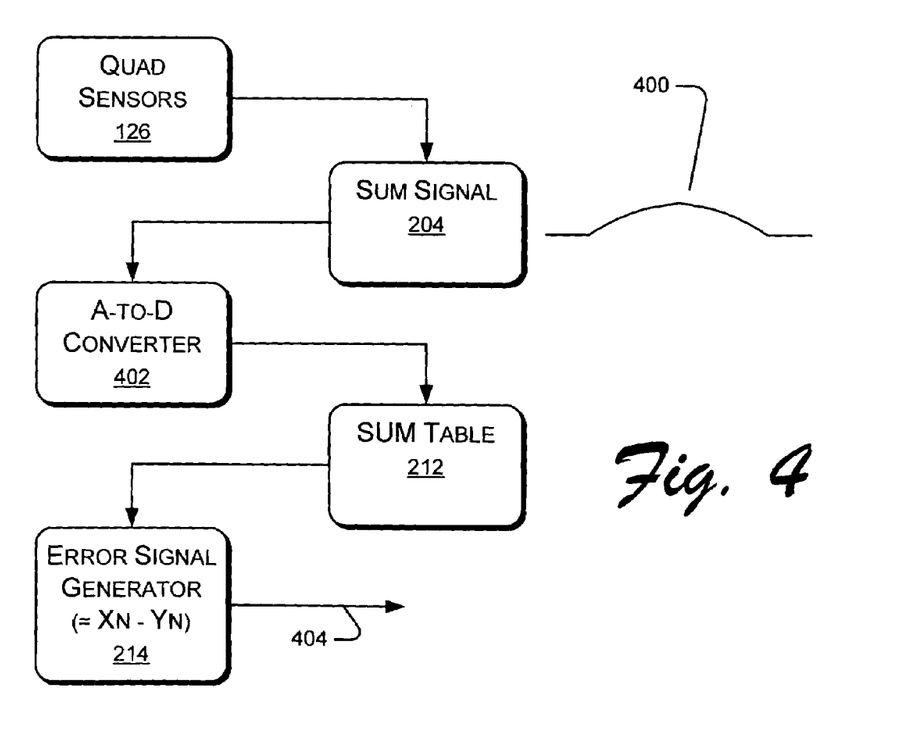
FIG. 4 is a block diagram showing an exemplary implementation of portions of the feed forward engine.

The operation of the quad focus sensors 126 may be better understood by briefly referring to FIG. 4. The quad sensors 126 (previously seen in FIG. 1) are typically optical sensors which respond to a reflection of the laser light 112. The SUM signal 204 is a summation of the output of the quad sensors 126. An exemplary SUM signal 400 is seen to the right of box 204 in FIG. 4. The SUM signal is zero where the optics 114–116 are out of focus. As the optics move into focus, the SUM signal becomes positive. Note that the SUM signal 400 is for illustration purposes only; a real SUM signal would be considerably noisier. The SUM signal is originally analog, but is typically converted into digital values by an A-to-D converter 402. The digital values of the SUM signal are suitable for insertion into columns 2 and 3 of the SUM value table 212, as will be seen. FIG. 4 will be discussed further, with respect to error term generation.

Table 1 illustrates exemplary contents of the SUM table 212, which records SUM data for use in generating an error term, and ultimately, for generating the actuator control signal 202 for consumption by the actuator focus coil 128. The first column of Table 1 indicates that each row in Table 1 provides information on one of the eight sectors of the disk 102. Recall that the eight sectors 302–316, illustrated in FIG. 3, were arbitrarily formed, and that an alternative number of sectors could be used.

Column 2 of Table 1 provides values X1–X8 which represent the summation of the SUM signal values taken while within the indicated sector (i.e. while that sector of the disk rotated by the quad focus sensors 126), while the actuator is adjusting the optics 114 to move the focal point toward the disk (i.e. while the focal point is being moved from the baseline location in a direction toward the disk). Similarly, column 3 of Table 1 provides values Y1–Y8 for the summation of the SUM signal values taken while within the indicated sector, while the actuator 128 moves the optics away from the disk. Column 2 may be associated with measurements of the SUM signal associated with a first revolution of the disk, while column 3 may be associated with measurements of the SUM signal associated with a second revolution of the disk. Note that while columns 2 and 3 contain SUM data, it is not actually necessary to keep these columns. Instead, the column 2 data can be immediately replaced with the difference between the column 2 and 3 terms, when the column 3 term becomes available. As will be seen later, the difference between columns 2 and 3 is representative of the gradient of the SUM curve (see FIG. 4), and therefore representative of the error term.

As will be seen in greater detail below, the relative size of the values in columns 2 and 3 indicate whether movement toward the disk (column 2) or away from disk (column 3) improves the focus of the optics 114–116. Accordingly, high values for the summation of the SUM signal samples seen in column 2 would indicate that the focus point was improved by moving the actuator and focal point toward the disk. Similarly, high values for the summation of the SUM signal samples seen in column 3 would indicate that the focus point was improved by moving the actuator and focal point away from the disk.

Columns 4 and 5 indicate that there are 400 sample locations on the disk (an arbitrarily selected number). Only the first 25 of the total 50 sample locations associated with each sector are sampled. The second 25 of the total 50 sample locations associated with each sector are not sampled; instead, as these sample locations pass by the quad focus sensors 126 as the disk 102 turns, the actuator 128 is allowed to return the optics 114 to the baseline position, prior to the sampling the SUM signal in 25 locations on the next sector. Thus, column 4 indicates sample locations wherein samples are taken; column 5 indicates sample locations that are not used, and wherein the actuator 128 and optics 114 allowed to return to the baseline position. Note that the information in columns 4 and 5 is exemplary and instructive in nature, and that the actual table 212 may not have this information.

Referring again to FIG. 2, the error term generator 214 is configured to use values from the SUM value table to create an error term 406 (FIG. 4). As seen in FIG. 4, the X and Y values for a given sector are removed from the table 212 at 406. The error term generator 214 includes a statement, procedure or code wherein the difference Xn–Yn is calculated, thereby resulting in the error term 404. As seen below, the error term may be called Ek. Note that the error term is intended for use within its respective sector, and that by arbitrarily defining more sectors on the disk, and more rows in the SUM table, above, greater control over the error term may be obtained.

In most implementations, the surface 106 of the disk 102 is labeled by applying an image to a series of annuluses, i.e. donut-shaped regions on the disk. This is beneficial, since the error may be a function of the radius of the disk. Accordingly, upon completion of one annulus, the SUM table 214 is updated, thereby enabling calculation of a new value for the error term, Ek. When a new value for the error term is obtain, an additional portion of an image may be applied to a further annulus of the surface 106 of the disk 102. Thus, the SUM table 212 is updated periodically in response to increasing radial distances (i.e. increasing movement by the sled 118 and laser 116 from the center of the disk 102). The intensity of the laser will have to be turned down as the SUM values are obtained, to avoid marking the disk during the process of gathering SUM data.

An actuator control signal generator 216 generates the signal 202 applied to the actuator focus coil 128. In a practical application, the output of the signal generator 216 is typically a digital value, which is converted to an analog signal via a DAC (digital to analog converter) for coupling to the actuator focus coil 128.

The actuator control signal generator 216 may be configured in a number of ways. In a first embodiment, a coefficient generator 218 is configured to generate coefficients for a Fourier series and a Fourier subroutine 220 is configured to utilize the coefficients generated to generate the signal for application to the actuator focus coil. For example, where a Fourier series having five terms is used, five coefficients could be generated according to:

$$A0(\text{new}) = A0(\text{old}) + (DC0 * Ek * Mu);$$

$$A1(\text{new}) = A1(\text{old}) + (QS1 * Ek * Mu);$$

$$B1(\text{new}) = B1(\text{old}) + (QC1 * Ek * Mu);$$

$$A2(\text{new}) = A2(\text{old}) + (QS2 * Ek * Mu); \text{ and}$$

$$B2(\text{new}) = B2(\text{old}) + (QC2 * Ek * Mu).$$

The above equations provide five new coefficients (e.g. A0(new)) using the five previous old coefficients (e.g A0(old)). For example, in one implementation, a new value for each coefficient is calculated 400 times per revolution of the disk 102. As the disk rotates, the error values, Ek, would change according to the sector of the disk on which the laser is currently focused. Additionally, the values for the sinusoidal terms (QS1 through QC2) would change due to a changing angle of rotation of the disk. Note that the initial value of A0 is the baseline value calculated by the baseline actuator positioning routine 210, and the initial values for A1–B2 are zero.

The above equations use A0 to express the coefficient for the non-sinusoidal first term, the nominal DC voltage level (DC0). The terms An and Bn express coefficients for sinusoidal terms "n", respectively. Terms of the form QS1 or QC2 correspond to a value of the sine or cosine of the first or second harmonic, as indicated, wherein the angle applied to the sinusoidal function is the angle of rotation of the disk (i.e. angular orientation) within the disk within the disk drive. Note that the angle of the sine or cosine is typically multiplied by a scalar, such as 1, 2, etc., so that the coefficients will have different frequency. For example, QS1 might be sin(theta), while QC2 might be cos(2*theta). An adaptation coefficient, Mu, is related to how fast the error coefficient, Ek, is allowed to change the value of the new coefficient. For example, Mu impacts how much change is possible between A1(new) and A1(old).

A Fourier routine 220 is configured to use the coefficients from the coefficient generator 218 and the angle of the disk rotation to produce the actuator control signal 202. The new coefficients may be applied according to the following:

$$\text{Actuator control signal} = (A0 * DC0) + (A1 * QS1) + (B1 * QC1) + (A2 * QS2) + (B2 * QC2)$$

In this case QS1 and QC2, for example, are the sine and cosine values, respectively, for the given value of an angle theta and two times theta, respectively, for the first and second harmonic, respectively.

In an alternative implementation, the actuator control signal generator 216 can be implemented without coefficients and a Fourier series. Such a more generalized feed forward scheme could be implemented wherein no-predetermined shape to the feed forward signals is defined. For each bit time, one bit of a sequence that starts at one point in the revolution of the disk and ends when the disk rotates back around to that point again could be stored in memory. Each bit in this sequence would be updated by the least mean squares (LMS) algorithm, but this time the algorithm would be: Wk(new)=Wk(old)−Mu*Ek.

Note that the equations above tend to work well for lower frequency spin rates (e.g. 300 rpm or so of the disk 102) and lower sample rates. Lower disk spin rates and sample rates tend to result in motion of the actuator that is below the actuator's resonant frequency. However, the resonant frequency of the actuator may result in a failure of focus to converge at higher disk speeds (i.e. higher disk rpm) and higher sample rates. That is, the resonant frequency of the actuator must be taken into account at higher disk spin rates; otherwise the input to the actuator will not result in the output expected, i.e. output which will result in movement of the optics to converge on a focal point. In the case of the Fourier Series based implementation, if the spindle speed increases to where the first, second or third harmonics of the once around are above the first suspension resonance of the focus actuator (at about 45 Hz) or if higher harmonics are to be used, then the value of the sine or cosine wave that is multiplied by the Ek*Mu products will also need to be phase shifted by the value of the response of the actuator to that input. Such a phase shift of terms within the actuator control signal will reduce actuator resonance. For example:

$$A1(\text{new}) = A1(\text{old}) + (QS1(\text{theta}) * Ek * Mu);$$

Where QS1(theta) equals QS1 phase shifted by the phase shift of the actuator at the frequency of QS1. As seen in the equation above, the phase of terms within the actuator control signal are shifted to the degree necessary to compensate for actuator harmonics (e.g. an actuator resonant frequency). This may be necessary if an angular disk speed of the optical disk drive is sufficiently high, or the sample rate of the SUM signal is sufficiently high, or some combination of both. For example, exemplary disk speed (rpm) and sample rates could be associated with a degree to which the actuator control signal is phase-shifted. The degree of the phase shift applied would generally have to be determined by experimentation on the actuator available. Accordingly, a table could associate disk speed rpm with a phase-shift of the actuator control signal.

For the case of the more generalized, non-Fourier Series implementation, compensation for the actuator resonance may be necessary if the sample rate exceeds the frequency of the resonance. This can be done by filtering the Ek values with a digital filter model of the inverse of the actuator frequency response before adapting each Wk. By passing the Ek values through the inverse filter function before applying to the adaptation algorithm Wk(new)=Wk(old)−Mu*Ek, the effects of the actuator resonance are essentially cancelled.

Other alternatives to the above method of handling the issue of actuator resonant frequency exist. For example, the Filtered X approach, known in algorithms related to adaptive LMS (least mean squares) filtering could be utilized.

Figure 5:
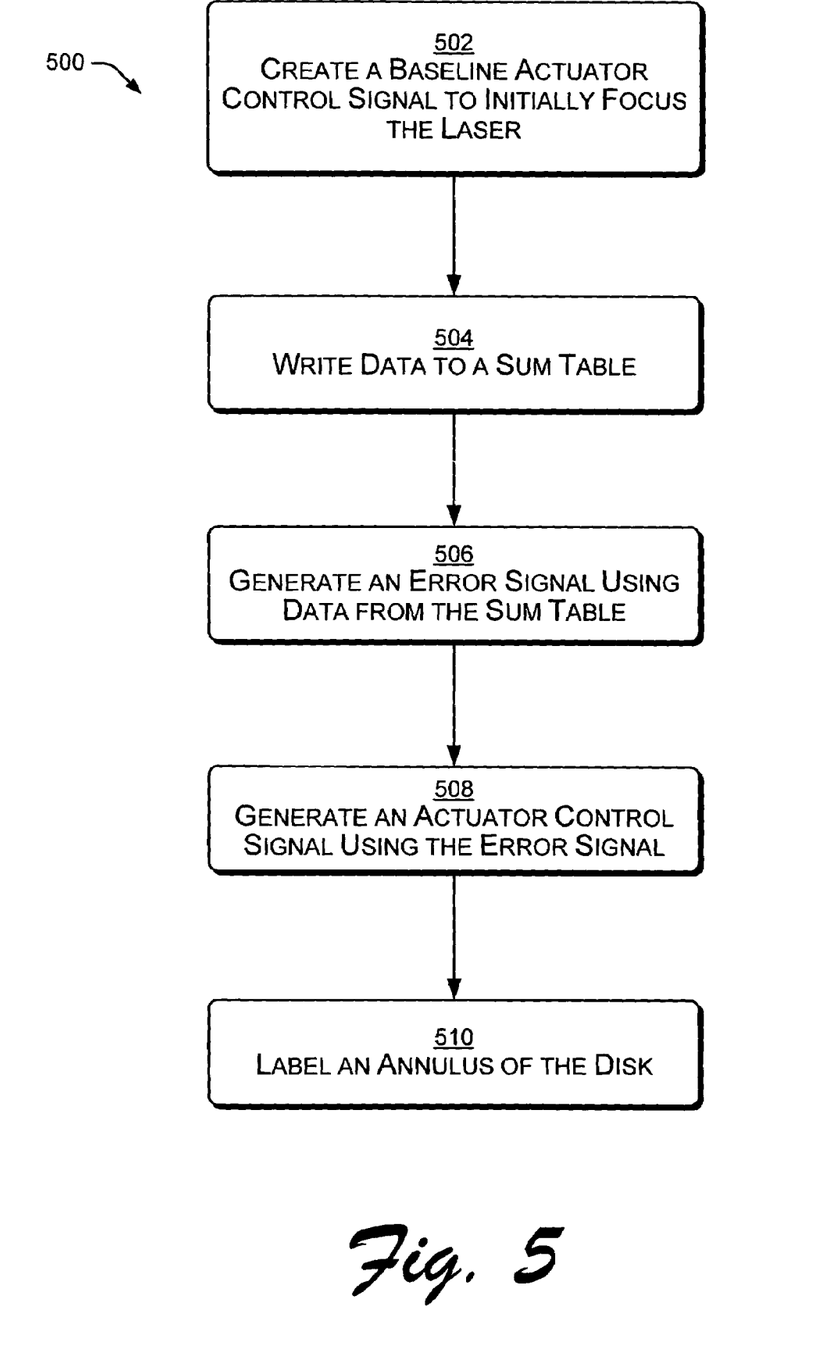
FIG. 5 is a flow diagram illustrating an exemplary implementation focusing optics within an optical drive.

The flowchart of FIG. 5 illustrates a further exemplary implementation, wherein a method 500 is employed to focus the optics of an optical disk drive 100. The elements of the method may be performed by any desired means, such as by the execution of processor-readable instructions defined on a processor-readable media, such as a disk, a ROM or other memory device or by operation of an application specific integrated circuit (ASIC) or other hardware device. In one implementation, the ROM may contain the firmware 132 of FIG. 1, thereby implementing the feed forward engine 200 of FIG. 2 according to a method such as the exemplary method as seen in the flow chart of FIG. 5. In an alternative implementation, an ASIC may contain logic which implements the feed forward engine 200. Also, actions described in any block may be performed in parallel with actions described in other blocks, may occur in an alternate order, or may be distributed in a manner which associates actions with more than one other block.

At block 502, a baseline actuator control signal is generated. The baseline actuator control signal, when applied to the actuator focus coil 128, results in the laser focusing sufficiently that the SUM signal obtained from the quad focus sensors 126 is non-zero. The baseline actuator control signal may be generated in a number of ways. For example, the first exemplary implementation of the baseline actuator positioning routine 210, described above, may be utilized. Recall that in that method, the baseline actuator signal was generated by assumptions made as to the location of the at-rest focal point and the signal required for application to the actuator focus coil 128 to move the focal point to the surface 106 of the disk 102. Alternatively, the second exemplary implementation of the baseline actuator positioning routine 210, described above, may be utilized. Recall that in that method, a range of voltages was applied to the actuator focus coil 128 and the SUM signal was monitored. A signal applied to the focus actuator coil 128 associated with a near optimal value of the SUM signal was obtained, either by using the signal that resulted in the high SUM value recorded, or by stepping the voltage applied to the actuator coil 128 and selecting, as the baseline voltage, a voltage applied to the coil 128 when the SUM signal was near the high SUM value.

At block 504, data is written to a SUM table 212. Exemplary detail of the SUM table 212 was seen as Table 1, above. In one implementation, the feed forward engine 200 may be used to write data to the SUM table 212. The baseline actuator control signal may be applied to the actuator focus coil 128, thereby moving the optics 114 to focus the laser 112 near the surface 106 of the disk 102. With the disk rotating, the feed forward engine 200 or other control procedure applies a signal, which piggybacks on the baseline actuator control signal and incrementally moves the focal point toward the surface 106 of the disk 102 in discrete steps. As the focal point is moved toward the disk, a first sector of which is passing by the quad focus sensors 126 which generate the SUM signal, a number (e.g. 25) of samples of the SUM signal are obtained and totaled. The number is inserted into the table 212, as seen in the discussion above. The baseline actuator control signal is then reapplied to the actuator focus coil 128, and the optics are allowed to return to the baseline focal point. As the disk continues to rotate, the second sector, adjacent to the first, moves into a position adjacent to the quad focus sensors 126, and the process of obtaining a total of the SUM values sensed, and of allowing the optics to return to the baseline position, is repeated. Subsequent sectors are similarly sampled, and column 2 of the SUM value table 212 is filled out. During a second revolution of the disk 102, a signal is piggybacked on to the baseline actuator control signal, and applied to the actuator focus coil 128, which incrementally moves the optics away from the surface 106 of the disk 102. Accordingly, column 3 of the table 212 may be filled out.

At block 506, an error term is generated using data from the SUM table 212. In particular, the error term may be generated by the error term generator 214. As seen in the discussion of the structure of the error term generator 214, above, the error term may be generated by obtaining a difference of the totals of the SUM values in columns 2 and 3 of Table 1. For example, an error term or term associated with the first sector may be obtain by subtracting the total of the SUM signal associated with moving the focal point away from the disk 102 (found in column 3 of Table 1) from the total of the SUM signal associated with moving the focal point toward the disk (found in column 2 of Table 1). An error term or value for each sector of the disk may be similarly calculated as the difference of the SUM terms.

At block 508, an actuator control signal 202 is generated using the error term and other terms. In particular, the actuator control signal 202 may be generated by the actuator control signal generator 216 of the feed forward engine 200. A number of exemplary, alternative and/or complementary implementations of the method by which the actuator control signal 202 is generated can be seen in FIG. 6. In an implementation at block 602, coefficients are generated and a Fourier series is summed. As seen above, a coefficient generator 216 can generate coefficients for use in a Fourier series. The Fourier subroutine 220, using the coefficients and a value for the angle of the disk orientation 206, determines the actuator control signal 202. This actuator control signal, which has been updated via the coefficient generator 216, becomes the new baseline signal for the next adaptation cycle.

Figure 6:
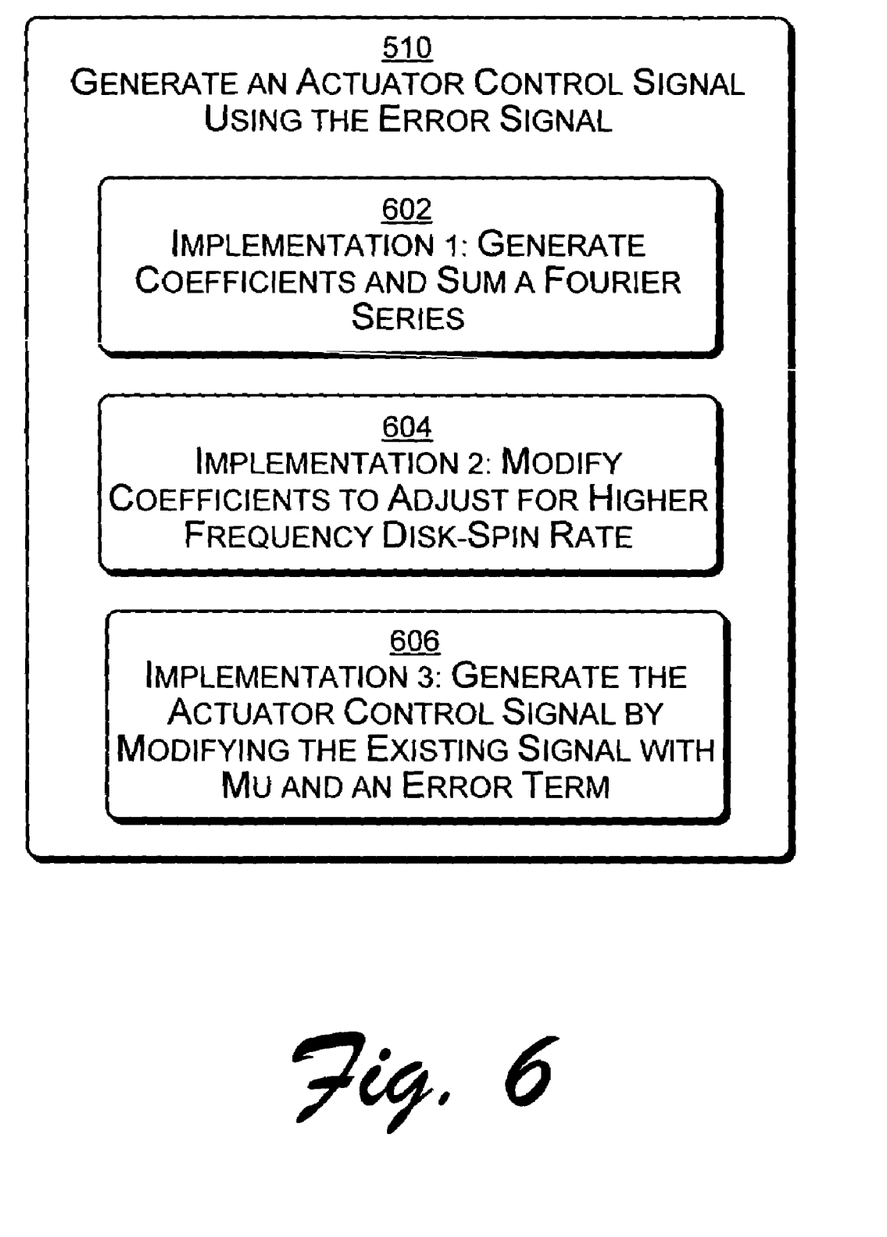
FIG. 6 is a flow diagram illustrating in greater detail a portion of the flow chart of FIG. 5.

In an optional implementation seen in block 604, where the spin-rate of the disk is high enough to interact with the suspension resonance of the actuator coil, the coefficient generator 218 can be modified to compensate for the interaction. This optional implementation was discussed with reference to the coefficient generator 218, in the discussion of FIG. 2, above.

In a further optional implementation seen at block 606, the actuator control signal generator 216 can be implemented without Fourier coefficients and without a Fourier series. As seen above, a generalized feed forward scheme could be implemented wherein no predetermined shape to the feed forward signals is defined.

Returning to FIG. 5, at block 510 an annulus of the disk is labeled. With the disk turning, the actuator control signal 202 is applied to the actuator focus coil 128. Accordingly, the optics 114 keep the laser 116 focused on the surface 106 of the disk 102. The laser beam 112 is then able to define an image on the coating on the surface 106. In one implementation, the annulus to which the image is applied is associated with 32 revolutions of the disk. Upon completion of the annulus, blocks 504–510 are repeated. The blocks are repeated until an image is fully applied to the surface 106 of the disk.

Although the above disclosure has been described in language specific to structural features and/or methodological steps, it is to be understood that the appended claims are not limited to the specific features or steps described. Rather, the specific features and steps are exemplary forms of implementing this disclosure. For example, while actions described in blocks of the flow diagrams may be performed in parallel with actions described in other blocks, the actions may occur in an alternate order, or may be distributed in a manner which associates actions with more than one other block. And further, while elements of the methods disclosed are intended to be performed in any desired manner, it is anticipated that computer- or processor-readable instructions, performed by a computer and/or processor, typically located within a firmware 132, reading from a computer- or processor-readable media, such as a ROM, disk or CD ROM, would be preferred, but that an application specific gate array (ASIC) or similar hardware structure, could be substituted.

The invention claimed is:

1. A system for providing a signal to an actuator within an optical disk drive, to focus optics on a disk within the optical disk drive, wherein the system comprises:

a SUM table within which to record SUM signal data, the SUM signal data representing a summation of values from a plurality of focus sensors, and is different than a focus error signal (FES) representing a difference between a sum of the values from a first subset of the focus sensors and a sum of the values from a second subset of the focus sensors;

an error term generator to process the SUM signal data from the SUM table to produce an error term; and an actuator control signal generator to generate an actuator control signal, wherein the actuator control signal is a function of a prior actuator position, the error term and an adaptation coefficient, wherein the adaptation coefficient is configured to regulate a rate at which the error term is allowed to modify the prior actuator position.

2. The system of claim 1, wherein the SUM table is configured to be updated prior to application of an image to an annular portion of the disk.

3. The system of claim 1, wherein the SUM table is configured to include summations of sampled SUM data associated with both actuator movement from a baseline toward the disk and away from the disk.

4. The system of claim 1, wherein each entry within the SUM table is associated with a sector of the disk and a direction of actuator movement.

5. The system of claim 1, wherein the SUM table is configured to include data obtained while moving an actuator in a first direction during a first disk revolution and data obtained while moving the actuator in a second direction during a second disk revolution.

6. The system of claim 1, wherein error term data is included within the SUM table for each sector, and comprises a difference between SUM signal data associated with actuator movement away from the disk and SUM signal data associated with actuator movement toward the disk.

7. The system of claim 1, wherein the error term generator is configured to calculate, for each sector, a difference of SUM signal data associated with actuator movement away from the disk and SUM signal data associated with actuator movement toward the disk.

8. The system of claim 1, wherein the error term generator is configured to calculate the error term for every sector of the disk.

9. The system of claim 1, wherein the actuator control signal generator additionally comprises:
a coefficient generator to generate coefficients as a function of inputs comprising the adaptation coefficient and the error term; and
a Fourier subroutine to generate the actuator control signal using the coefficients generated.

10. The system of claim 1, wherein the actuator control signal generator additionally comprises:
a coefficient generator configured to generate coefficients comprising:

$A0=A0+(DC0*Ek*Mu);$ $A1=A1+(QS1*Ek*Mu);$ $B1=B1+(QC1*Ek*Mu);$ $A2=A2+(QS2*Ek*Mu);$ and $B2=B2+(QC2*Ek*Mu);$ wherein Ek is the error term; Mu is the adaptation coefficient; A0, A1, A2, B1, and B2 are the coefficients generated by the coefficient generator; QS1, QS2, QC1, and QS2 are sinusoidal or cosinusoidal terms; and, DC0 is a nominal voltage level; and
a Fourier subroutine configured to generate the actuator control signal using the coefficients generated.

11. The system of claim 1, wherein the actuator control signal generator is configured to generate a control signal according to $Wk(new)=Wk(old)-(Mu*Ek)$, where Wk is the control signal, Ek is an error term and Mu is an adaptation coefficient.

12. The system of claim 1, wherein the actuator control signal generator is configured, if an angular disk speed of the optical disk drive is sufficiently high, to shift a phase of terms within the actuator control signal to improve convergence of coefficient generation.

13. The system of claim 1, additionally comprising a baseline actuator positioning routine to set a baseline voltage level.

14. The system of claim 13, wherein the baseline voltage level has an AC component which varies as a function of disk angular orientation.

15. The system of claim 1, additionally comprising a baseline actuator positioning routine, to establish a baseline signal for application to an actuator, wherein the baseline actuator positioning routine is configured to:
step an actuator through a full range of focus;
record a maximum value of the SUM signal data obtained within the full range of focus; and
set the baseline signal according to an input to the actuator which resulted in close to the maximum value of the SUM signal data.

16. A processor-readable medium comprising processor-executable instructions for focusing optics on a disk within an optical disk drive, the processor-executable instructions comprising instructions for:
writing data to a SUM table, wherein the data is grouped according to disk sector and according to movement of an actuator toward and away from the disk, the data written to the SUM table representing a summation of values from a plurality of focus sensors, and is different than a focus error signal (FES) representing a difference between a sum of the values from a first subset of the focus sensors and a sum of the values from a second subset of the focus sensors;
generating an error term using data from the SUM table; and
generating an actuator control signal as a function of a prior actuator position, the error term and an adaptation coefficient used to impact a rate at which the actuator control signal varies.

17. A processor-readable medium as recited in claim 16, comprising instructions updating the SUM table prior to application of an image on an annular portion of the disk.

18. A processor-readable medium as recited in claim 16, wherein writing data to the SUM table comprises instructions for:
obtaining and writing data to the SUM table while moving the actuator in a first direction from a baseline position through a portion of each sector of the disk during a first revolution; and
obtaining and writing data to the SUM table while moving the actuator in a second direction from the baseline position through a portion of each sector of the disk during a second revolution.

19. A processor-readable medium as recited in claim 16, comprising instructions for updating the SUM table with data from the SUM signal prior to application of an image to an annular portion of the disk.

20. A processor-readable medium as recited in claim 16, wherein generating the error term comprises instructions for selecting a number of sectors to be defined on the disk.

21. A processor-readable medium as recited in claim 16, wherein generating the error term comprises instructions for generating an error term for each sector of the disk by calculating a difference between data from the SUM table associated with focusing optics being moved closer to the disk and data from the SUM table associated with the focusing optics being moved further from the disk.

22. A processor-readable medium as recited in claim 16, comprising instructions for updating the SUM table prior to application of an image to an annular portion of the disk.

23. A processor-readable medium as recited in claim 16, wherein generating the actuator control signal comprises instructions for:
  generating coefficients as a function of inputs comprising the adaptation coefficient and the error term; and
  calculating a Fourier series to generate the actuator control signal using the coefficients generated.

24. A processor-readable medium as recited in claim 16, wherein generating the actuator control signal comprises instructions for:
  generating coefficients comprising:

$A0=A0+(DC0*Ek*Mu);$ $A1=A1+(QS1*Ek*Mu);$ $B1=B1+(QC1*Ek*Mu);$ $A2=A2+(QS2*Ek*Mu);$ and $B2=B2+(QC2*Ek*Mu);$ wherein Ek is the error term; Mu is the adaptation coefficient; A0, A1, A2, B1, and B2 are the coefficients generated by the coefficient generator; QS1, QS2, QC1, and QS2 are sinusoidal or cosinusoidal terms; and, DC0 is a nominal voltage level; and
  calculating a Fourier series to generate the actuator control signal using the coefficients generated.

25. A processor-readable medium as recited in claim 16, wherein generating the actuator control signal comprises instructions for calculating the actuator control signal according to Wk(new)=Wk(old)−(Mu*Ek), wherein Wk is the actuator control signal, Ek is the error term, and Mu is the adaptation coefficient.

26. A processor-readable medium as recited in claim 25, wherein generating the actuator control signal comprises instructions for, if an angular disk speed of the optical disk drive is sufficiently high, shifting a phase of terms within the actuator control signal to compensate for actuator harmonics.

27. A processor-readable medium as recited in claim 16, comprising instructions for creating a baseline signal.

28. A processor-readable medium as recited in claim 16, wherein creating the baseline signal to initially position an actuator comprises instructions for:
  step an actuator through a full range of focus;
  record a maximum value of the SUM signal data obtained within the full range of focus, and
  set the baseline signal according to an input to the actuator which resulted in close to the maximum value of the SUM signal data.

29. A method of focusing optics on a disk within an optical disk drive, comprising:
  writing data to a SUM table, wherein the data is grouped according to disk sector, the data written to the SUM table representing a summation of values from a plurality of focus sensors, and is different than a focus error signal (FES) representing a difference between a sum of the values from a first subset of the focus sensors and a sum of the values from a second subset of the focus sensors;
  generating an error term using data from the SUM table; and
  generating an actuator control signal using the error term and an adaptation coefficient configured to impact a rate at which the actuator control signal varies.

30. The method of claim 29, additionally comprising updating the SUM table with data from the SUM signal prior to application of an image to an annular portion of a label surface of the disk.

31. The method of claim 29, additionally comprising:
  obtaining and writing data to the SUM table while moving an actuator in a first direction from a baseline position through a portion of each sector of the disk during a first revolution; and
  obtaining and writing data to the SUM table while moving the actuator in a second direction from the baseline position through a portion of each sector of the disk during a second revolution.

32. The method of claim 29 wherein generating the error term comprises generating an error term for each sector of the disk by calculating a difference between data from the SUM table associated with focusing optics being moved closer to the disk and data from the SUM table associated with the focusing optics being moved further from the disk.

33. The method of claim 29, wherein generating the actuator control signal comprises:
  generating coefficients as a function of inputs comprising the adaptation coefficient and the error term; and
  calculating a Fourier series to generate the actuator control signal using the coefficients generated.

34. The method of claim 29, wherein generating the actuator control signal comprises:
  generating coefficients comprising:

$A0=A0+(DC0*Ek*Mu);$ $A1=A1+(QS1*Ek*Mu);$ $B1=B1+(QC1*Ek*Mu),$ $A2=A2+(QS2*Ek*Mu);$ and $B2=B2+(QC2*Ek*Mu);$ wherein Ek is the error term and Mu is the adaptation coefficient; and
  calculating a Fourier series to generate the actuator control signal using the coefficients generated.

35. The method of claim 29, additional comprising creating a baseline signal for initial use as the actuator control signal.

36. The method of claim 35, wherein creating the baseline signal to initially position an actuator comprises:
  stepping an actuator through a full range of focus;
  recording a maximum value of the SUM signal data obtained within the full range of focus; and
  setting the baseline signal according to an input to the actuator which resulted in close to the maximum value of the SUM signal data.

37. The method of claim 29, wherein generating the actuator control signal comprises calculating the actuator control signal according to Wk(new)=Wk(old)−(Mu*Ek), wherein Ek is the error term and Mu is the adaptation coefficient.

38. The method of claim 37, wherein generating the actuator control signal additionally comprising, if an angular disk speed of the optical disk drive is sufficiently high, shifting a phase of terms within the actuator control signal to compensate for actuator harmonics.

39. A focusing system, comprising:
  means for writing data to a SUM table, wherein the data is grouped according to disk sector, the data written to the SUM table representing a summation of values from a plurality of focus sensors, and is different than a focus error signal (FES) representing a difference between a sum of the values from a first subset of the focus sensors and a sum of the values from a second subset of the focus sensors;
  means for generating an error term using data from the SUM table; and
  means for generating an actuator control signal using the error term and an adaptation coefficient used to impact a rate at which the actuator control signal varies.

40. The focusing system of claim 39, additionally comprising means for updating the SUM table prior between applications of an image to annular portions of the disk.

41. The focusing system of claim 39, additionally comprising:
  means for obtaining and writing data to the SUM table while moving an actuator in a first direction from a baseline position through a portion of each sector of the disk during a first revolution; and
  means for obtaining and writing data to the SUM table while moving the actuator in a second direction from the baseline position through a portion of each sector of the disk during a second revolution.

42. The focusing system of claim 39, wherein the means for generating the error term comprises means for generating an error term for each sector of the disk by calculating a difference between data from the SUM table associated with focusing optics being moved closer to the disk and data from the SUM table associated with the focusing optics being moved further from the disk.

43. The focusing system of claim 39, additionally comprising means for updating the SUM table prior to application of an image to an annular portion of the disk.

44. The focusing system of claim 39, wherein the means for generating the actuator control signal comprises:
  means for generating coefficients as a function of inputs comprising the adaptation coefficient and the error term; and
  means for calculating a Fourier series to generate the actuator control signal using the coefficients generated.

45. The focusing system of claim 39, wherein the means for generating the actuator control signal comprises:
  means for generating coefficients comprising:

$$A0=A0+(DC0*Ek*Mu);$$

$$A1=A1+(QS1*Ek*Mu);$$

$$B1=B1+(QC1*Ek*Mu);$$

$$A2=A2+(QS2*Ek*Mu); \text{ and}$$

$$B2=B2+(QC2*Ek*Mu);$$

wherein Ek is the error term and Mu is the adaptation coefficient; and
  means for calculating a Fourier series to generate the actuator control signal using the coefficients generated.

46. The focusing system of claim 39, wherein the means for generating the actuator control signal comprises means for calculating the actuator control signal according to Wk(new)=Wk(old)−(Mu*Ek), wherein Ek is the error term and Mu is the adaptation coefficient.

47. The focusing system of claim 46, wherein the means for generating the actuator control signal additionally comprises, if an angular disk speed of the optical disk drive is sufficiently high, means for shifting a phase of terms within the actuator control signal to compensate for actuator harmonics.

48. The focusing system of claim 39, additional comprising means for creating a baseline signal, wherein the baseline signal is different in different sectors of the disk.

49. The focusing system of claim 39, wherein creating the baseline signal to initially position an actuator comprises:
  means for stepping the actuator through a full range of focus;
  means for recording a maximum value of the SUM signal data obtained within the full range of focus; and
  means for setting the baseline signal according to an input to the actuator which resulted in close to the maximum value of the SUM signal data.

* * * * *

UNITED STATES PATENT AND TRADEMARK OFFICE
CERTIFICATE OF CORRECTION

| | | |
|---|---|---|
| PATENT NO. | : 7,177,246 B2 | Page 1 of 1 |
| APPLICATION NO. | : 10/661394 | |
| DATED | : February 13, 2007 | |
| INVENTOR(S) | : Darwin Mitchel Hanks et al. | |

It is certified that error appears in the above-identified patent and that said Letters Patent is hereby corrected as shown below:

In column 11, line 62, in Claim 10, after "and" delete "QS2" and insert -- QC2 --, therefor.

In column 13, line 30, in Claim 24, after "and" delete "QS2" and insert -- QC2 --, therefor.

In column 13, line 54, in Claim 28, delete "focus," and insert -- focus; --, therefor.

Signed and Sealed this

Eighteenth Day of August, 2009

David J. Kappos
*Director of the United States Patent and Trademark Office*